United States Patent [19]
Anderson

[11] 3,741,049
[45] June 26, 1973

[54] CUTTING TOOL
[75] Inventor: George B. Anderson, Rochester, N.Y.
[73] Assignee: USM Corporation, Boston, Mass.
[22] Filed: June 7, 1971
[21] Appl. No.: 150,280

[52] U.S. Cl. ............... 82/37 R, 29/96 R, 29/106 R
[51] Int. Cl. ......................... B23b 29/00, B26b 1/00
[58] Field of Search ..................... 29/96, 97, 106; 82/37

[56] References Cited
UNITED STATES PATENTS
2,949,662   8/1960   Cook et al. ............................ 29/96
3,246,382   4/1966   Zierden ................................. 29/96
3,629,919   12/1971  Trevarrow ............................ 29/96
3,577,819   5/1971   Scheidler ............................. 82/37
3,455,002   7/1969   Miller .................................. 29/97
3,136,031   6/1964   Cassidy ............................... 29/97

Primary Examiner—Harrison L. Hinson
Attorney—Shlesinger, Fitzsimmons & Shlesinger

[57] ABSTRACT

A tool holder with a carbide tool bit may be secured on a tool block selectively in either of two positions at right angles to one another to perform different cutting operations. Filler cartridges are used in conjunction with the tool holder. In one position a filler cartridge helps locate the tool holder on the tool block. The tool holder is located by the tool block in its other position. The filler cartridges may be ported to conduct coolant to the points of cut.

7 Claims, 6 Drawing Figures

Patented June 26, 1973  3,741,049

INVENTOR.
GEORGE B. ANDERSON
BY
ATTORNEYS

INVENTOR.
GEORGE B. ANDERSON

CUTTING TOOL

The present invention relates to cutting tools, and more particularly to cutting tools using carbide cutting bits. In a more specific aspect the invention relates to a cutting tool holder that is mountable as a cartridge on a tool block which, with the cartridge, is removable and replaceable as a unit on a machine tool.

One object of this invention is to provide a tool cartridge which is mountable in different positions on a tool block to provide different modes of cutting operations.

Another object of the invention is to provide a cutting tool cartridge which can be preset to a programmed position on the tool block before assembly of the tool block on the cutting machine.

Another object of the invention is to provide a cutting tool cartridge which may be assembled on the machine quickly by either manual or automatic means.

Another object of the invention is to provide a tool block assembly to which a coolant can readily be applied.

Still another object of the invention is to provide a cutting tool construction which will require only a minimum of tool inventory to equip a plurality of machines.

Other objects of the invention will be apparent hereinafter from the specification and from the recital of the appended claims, particularly when read in conjunction with the accompanying drawings.

Figure 2:
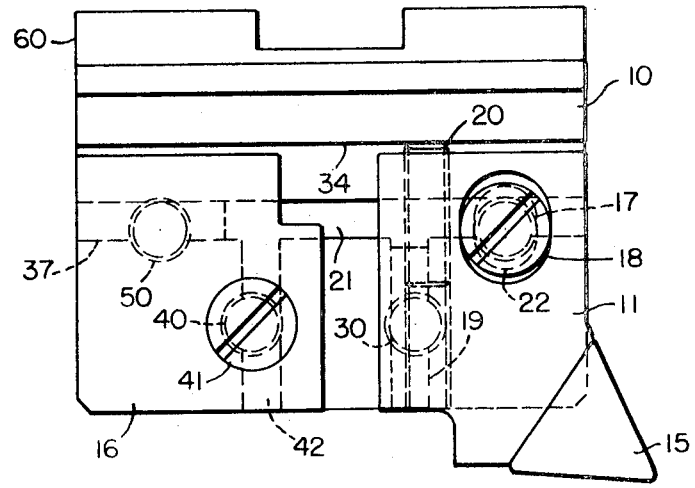
FIG. 2 is a view of this same tool cartridge and block but with the tool cartridge mounted in a different position on the block to perform a different cutting operation from that performed when the tool cartridge is in the position shown in FIG. 1.
Figure 1:
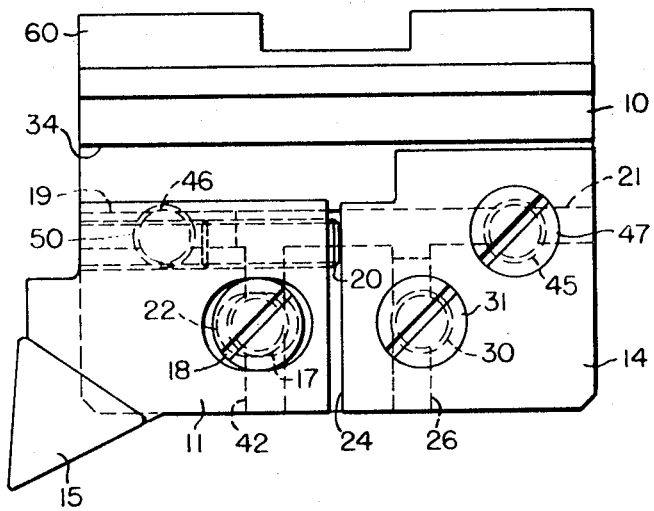
FIG. 1 is a view of a cutting tool cartridge and a companion filler cartridge made according to one embodiment of this invention and mounted in one position on a tool block.
Figure 3:
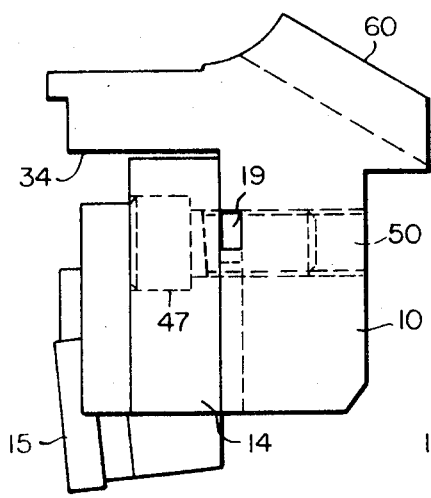
FIG. 3 is a fragmentary end elevation of the tool cartridge and block when the tool cartridge is mounted on the block in the position of FIG. 1.

Referring now to the drawings by numerals of reference, and first to FIGS. 1 and 2, 10 denotes a tool block; 11 designates a tool cartridge; and 14 denotes a combination filler and stop block used when the tool cartridge is in the position shown in FIG. 1. A different filler cartridge 16 is used when the tool cartridge 11 is shifted on the tool block to the position shown in FIG. 2.

The cartridge 11 carries a carbide cutting bit or insert 15, which is here shown as of triangular shape but which may be of various shapes and sizes, and may be secured to a suitable cartridge 11 in any conventional manner.

FIG. 1 shows the carbide cutting bit 15 positioned, for instance, for a turning or facing operation; and FIG. 2 illustrates its position, for example, for a boring operation.

Figure 6:
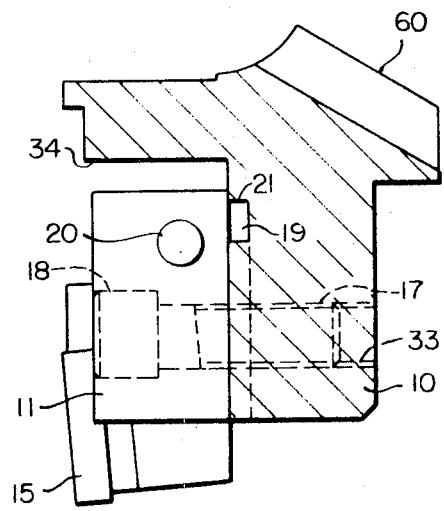
FIG. 6 is a section on the line 6—6 of FIG 4, looking in the direction of the arrows.

The cartridge 11 is adapted to be secured removably to the tool block 10 in either position by a bolt 17 that has a knurled head 18 and that is threadable into a hole 33 (FIG. 6) in block 10. A key 19, which is integral with the cartridge 11 is engageable in a keyway 21 (FIG. 6) in the block 10 to locate the cartridge fore and aft on the tool block when the cutting insert or bit is in cutting position shown in FIG. 1. Keyway 21 extends across the full width of tool block 10. The lateral position of the tool cartridge is here precisely determined by a screw 20 which threads into the cartridge and which abuts at its inner end against the surface 24 of the filler cartridge 14. The slot 22 in the cartridge 11, through which the bolt 17 extends, is elongated to permit this adjustment. The screw 20 is parallel to key 19 but above it.

Filler 14 has a key 26 (FIG. 5) integral with it which is adapted to be engaged in a way 28 (FIG. 4) formed in tool block 10 at right angles to keyway 21. A bolt 30 threads into the hole 31 in tool block 10 to hold the filler block 14 in position.

The tool cartridge 11 is of generally rectangular shape in plan, and is of greater dimension in one direction than in the other; and its area is less than half that of the surface of the tool block upon which it may be seated. It is turned at right angles from the position it occupies in FIG. 1 to that of FIG. 2, and vice versa.

To shift the cutting bit from the FIG. 1 to the FIG. 2 position, the securing bolts 17 and 30 are released; and the cartridge 11 and filler 14 are lifted off and the cartridge is moved to the position shown in FIG. 2. The screw 20 now engages the surface 34 (FIG. 5) of the tool block to control the position of the cartridge 11 forward or backward on the tool block. The oval opening 22 in the tool cartridge again permits limited adjustment in either direction. A fixture gauge may be used to locate the position of the insert tip precisely with relation to the block reference surface 34. This fixture can also be employed to relate the insert tip, when in the position of FIG. 1, to the filler reference surface 24. Ordinarily, however, the adjustments of the tool shank on the machine will be used for precisely positioning the tool radially of the workpiece.

When the tool cartridge 11 is on the tool block 10 in the position of FIG. 2, the filler cartridge 16 is used. It is releasably secured to the block 10 by a screw 41, that has a knurled head 41; and it has an integral key 42 that engages in a keyway in block 10.

Both filler cartridges 14 and 16 have holes 45 and 46, respectively, through them which align with holes or ducts, one of which is shown at 50, in the tool block, as will now be explained, to permit coolant to be conducted through the tool block and the filler cartridges to the cutting insert or bit.

Figure 4:
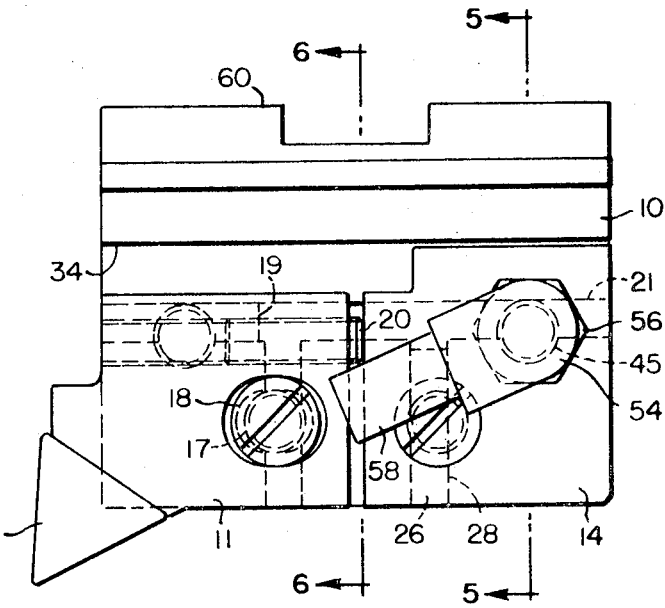
FIG. 4 shows the tool cartridge and filler cartridge with the addition to the filler cartridge of a nozzle for flooding or misting the tool during cutting.
Figure 5:
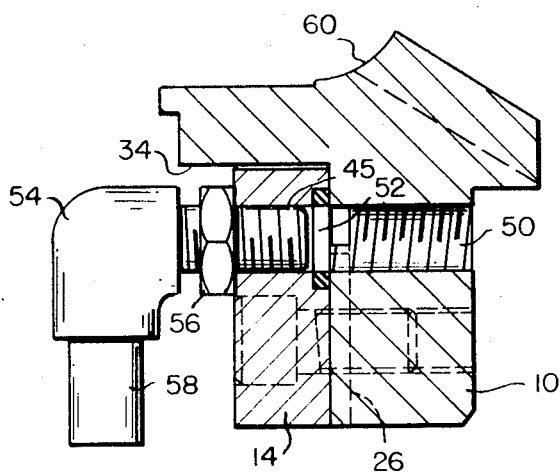
FIG. 5 is a section on the line 5—5 of FIG. 4, looking in the direction of the arrows.

In the embodiment of the invention specifically illustrated in FIGS. 4 and 5, the cartridge 11 is shown in the same position as in FIG. 1 but is here connected to the coolant supply to permit flooding the tool with coolant during the cutting operation. For this purpose the shank which supports the tool block assembly may be ported, and the coolant supplied to the tool through the duct 50 in the tool block 10, hole 45 in the filler cartridge 14, a conventional threaded swivel fitting 54, and the pipe 58 which is part of the fitting and is swivable to direct the coolant onto the work and the tool bit.

If desired, a spray nozzle may be secured over the mouth of pipe 58 to spray the coolant in mist form onto the work and tool.

With the construction herein described, the cartridge 11 and filler 14 may be bench-assembled on the tool block 10, and the tool block can be loaded manually or automatically on the tool shank of the cutting machine. The tool block has an arcuate surface 60 adapted to be used in releasably clamping the block to the shank as disclosed in my U. S. Pat. No. 3,545,318, issued Dec. 8, 1970.

While the invention has been described in connection with specific embodiments thereof it will be understood that it is capable of further modification, and this application is intended to cover any uses, adaptations or modifications of the invention that come within the present disclosure or within the limits of the appended claims.

Having thus described my invention, what I claim is:

1. A tool block assembly comprising
  a tool block,
  a tool cartridge,
  a cutting tool secured to said cartridge with its cutting edge projecting from one side of said cartridge,
  means for removably securing said cartridge to said tool block selectively at either of two opposite sides of said block to project selectively from opposite sides of said block, respectively,
  said cartridge extending approximately half-way across the tool block in either of its positions, and said tool cartridge in one of its positions extending at right angles to the tool cartridge in the other of its positions, and
  an auxiliary filler cartridge removably fastened to the other part of said tool block, the means for fastening said auxiliary filler cartridge to said block including a hollow fitting having a head pivotally mounted thereon, and a conduit secured to said head, said conduit and said head having ducts communicating with the bore of said fitting to conduct a coolant to said tool.

2. A tool block assembly comprising
  a tool block,
  a tool cartridge which is generally rectangular in shape and is of greater dimension in one direction than in the other and which is of an area less than half that of said tool block,
  a tool secured at one corner of said tool cartridge, and
  means for securing said cartridge to said block on one part of said tool block selectively either with its greater dimension widthwise of said block or on another part of said block with its greater dimension extending at right angles to the first-named position, the tool in said firstnamed position being disposed at one side of said block and in the other position being disposed at the opposite side of said block.

3. A tool block assembly comprising
  a tool block having a first keyway extending across its width and a second keyway extending at right angles to said first keyway,
  a tool cartridge having a key integral therewith and adapted to be positioned on said tool block selectively in two positions at right angles to one another with said key engaged selectively in one of said two named keyways, and
  a tool secured to said tool cartridge at one corner of said tool cartridge to project at opposite sides, respectively, of the tool block in the two positions, respectively, of the tool cartridge.

4. A tool block assembly as claimed in claim 3, wherein said tool cartridge has an adjusting screw threaded in it to engage in one position of said tool cartridge against a surface on said tool block to locate said tool cartridge on said tool block, and said screw extends parallel to said key.

5. A tool block assembly as claimed in claim 4, wherein said screw abuts against a filler cartridge that is removably secured to said tool block in the other position of said tool cartridge to locate said tool cartridge precisely on said tool block when said tool cartridge is in its said other position, said filler cartridge having a key integral with it which engages in the other keyway.

6. A tool block assembly as claimed in claim 3, having a filler cartridge secured to said tool block on that portion of said tool block against which said tool cartridge is not positioned, said filler cartridge having a swivel fixture thereon, through which a coolant may be directed onto said tool.

7. A tool block assembly as claimed in claim 6, wherein said tool cartridge has an adjusting screw threaded therein and extending parallel to said key and engageable against said filler cartridge in one position of said tool cartridge on said tool block to precisely position said tool, and engageable in the other position of said tool cartridge against a surface on said block to position said tool precisely when said tool cartridge is in its other position on said tool block.

* * * * *